United States Patent [19]

Sutton et al.

[11] Patent Number: 4,687,556
[45] Date of Patent: Aug. 18, 1987

[54] PREVENTING STRESS CORROSION CRACKING OF BEARINGS

[75] Inventors: Robert F. Sutton, Newbury Park; Kathleen E. Kirkham, Sunland, both of Calif.

[73] Assignee: Rockwell International Corporation, El Segundo, Calif.

[21] Appl. No.: 811,967

[22] Filed: Dec. 19, 1985

[51] Int. Cl.[4] .............................................. C25D 5/34
[52] U.S. Cl. ........................................ 204/29; 72/53; 148/11.5 R; 427/328; 427/383.7; 427/383.9
[58] Field of Search .............. 204/29; 72/53; 427/328, 427/383.7, 383.9; 148/11.5 R

[56] References Cited

U.S. PATENT DOCUMENTS

| | | | |
|---|---|---|---|
| 3,287,157 | 11/1966 | Brown et al. | 427/328 |
| 3,642,519 | 2/1972 | Tinett et al. | 427/328 |
| 3,754,976 | 8/1973 | Babecki | 427/328 |
| 3,844,846 | 10/1974 | Friske et al. | 148/11.5 R |
| 4,034,585 | 7/1977 | Straub | 72/53 |
| 4,441,349 | 4/1984 | Symons | 72/53 |
| 4,470,184 | 9/1984 | Fukuoka et al. | 427/383.7 |

OTHER PUBLICATIONS

"Shot Peening of Metals for Protection Against Stress Corrosion Cracking", H. Suss, *Corrosion*, vol. 18, Jan. 1982.
"Control of Stress Corrosion Cracking by Shot Peening", Takemoto, M. et al, 1st Int'l. Conf. on Shot Peening, Paris, France, Sep. 1981.
"Controlled Shotpeening Prevents Stress-Corrosion Cracking", J. J. Daly, *Chemical Engineering*, Feb. 16, 1976, pp. 113–116.
"Shot Peening Prevents Stress Cracking in Aircraft Equipment", Milo, J. H., *Corrosion Source Book*, American Society for Metals, 1984, pp. 308–311.
"Effect of Multiple Shot Peening/Cadmium Plating on High Strength Steel", Kohls, J. B. et al, AFWAL–TR-80-4005, Apr. 1980, 51 pages.

*Primary Examiner*—Arthur P. Demers
*Attorney, Agent, or Firm*—H. Fredrick Hamann; Harry B. Field; Lawrence N. Ginsberg

[57] ABSTRACT

A method of inhibiting stress corrosion cracking of a bearing 10 of the type installed on a shaft with an interference fit. The surface of the inner ring 16 is shot peened at least at and near the junctures 28, 30 of the endwalls 22, 24 with cylindrical inner surface 26. The shot peening is performed with sufficient intensity to produce residual compressive stress which offsets at least a portion of the tensile stress resulting from the installation interference fit. The shot peened surface is then coated with a thin metallic material. Finally, the inner bearing ring 16 is baked to remove hydrogen resulting from the coating.

14 Claims, 2 Drawing Figures

PREVENTING STRESS CORROSION CRACKING OF BEARINGS

BACKGROUND OF THE INVENTION

The invention relates to method for preventing stress corrosion cracking of bearings. It particularly relates to preventing stress corrosion cracking of bearing inner rings used in high speed cryogenic rotating machinery, such as turbopumps. Rocket engines or vehicles operating around space stations, orbital transport vehicles, and engines for high-orbit satellites may have turbopumps which run at very high speeds. The bearing material used in the Rockwell International Corp. designed Orbital Transfer Vehicle cryogenic engine turbopumps is AISI type 440C stainless steel which has a coefficient of thermal contraction less than the shaft material. This cryogenic engine's fuel turbopump runs at approximately 110,000 rpm. Due to this high speed and the differential expansion characteristic of the bearings and shaft, the bearing inner rings must be installed with relatively tight fits at room temperature (producing a hoop stress of about 50,000 psi). This tight fit is required in order to maintain a defined operational fit during cryogenic operation and to control the rotordynamic behavior of the turbomachine's rotor.

During bearing installation on the turbopump shafts, bearing inner rings are heated with a heating pad up to +300° F. while the shafts are chilled in liquid nitrogen (−320° F.). The bearing inner rings are quickly slipped over the shaft and the assembly is allowed to return to room temperature before continuing with the build. No other installation procedure has been developed for these tight interference fit bearing rings. This operation permits the accumulation of moisture beneath the bearing inner rings, which, if combined with the high hoop stress, can cause stress corrosion and resultant bearing inner ring cracking.

The rate at which stress corrosion cracking occurs is highly dependent on the magnitude of the hoop stress in the presence of moisture. Based on static test data developed for the Space Shuttle Program, the unprotected bearing inner rings of the Rockwell International designed MK49 turbopumps (50,000 psi hoop stress) were projected to crack within four days of installation—without ever having been subjected to operational spin testing.

Several methods were investigated for improving or limiting stress corrosion cracking behavior of AISI type 440C inner bearing rings. For example, by assembling a bearing inner ring on a shaft in as dry an environment as possible, and keeping the assembly dry, the time to failure is greatly extended. However, during pump assembly, storage and use it is extremely difficult to eliminate all the moisture from the system at all times. Therefore, this method by itself was determined to be impracticable. Nevertheless, a good practice is to attempt to keep the internal areas of the turbomachine reasonably dry.

Another method considered for improving or limiting stress corrosion cracking behavior was the possibility of changing the material surface composition to render it less reactive to the environment. For example, changing the surface chemistry by implantation of a corrosion resistant material such as chromium. However, this method involved a relatively high number of unknown factors and it was not known if the corrosion characteristics of 440C stainless steel could be altered sufficiently to significantly offset its stress corrosion cracking behavior. The method was therefore not tested.

The use of a less susceptible material than 440C was investigated. However, few materials perform satisfactorily as antifriction bearing materials under cryogenic conditions. Testing of these materials did not show any advantage with respect to stress corrosion cracking.

Redesigning the turbopump to reduce the stresses on the bearing inner rings was considered; however, redesign was not practical because of the relatively small size of the turbopump shafts and the limited space surrounding the bearings.

OBJECTS OF THE INVENTION

Accordingly, it is an object of the present invention to provide a simple, and relatively inexpensive method for preventing stress corrosion cracking of bearing inner rings, thereby increasing their operational life.

Other objects, advantages and novel features of the present invention will become apparent from the following detailed description of the invention when considered in conjunction with the accompanying drawing.

SUMMARY OF THE INVENTION

In accordance with the present invention, in order to prevent stress corrosion cracking of bearings, the surface of the bearing inner ring, at least at and near the junctures of the endwalls with the inner surface of the inner ring, is shot peened with sufficient intensity to produce residual compressive stress which offsets at least a portion of the tensile stress resulting from installation interference fit. After shot peening, the shot peened surface is coated with a metallic material and then the inner ring is baked to remove hydrogen resulting from the coating.

DETAILED DESCRIPTION OF THE INVENTION

In its broadest aspects, the present invention provides a process for preventing or markedly inhibiting stress corrosion cracking of bearing inner rings formed of alloys susceptible to such cracking during exposure to the corrosive environment. Such alloys, susceptible to differing degrees, include various hardened martensitic stainless steels. As noted, AISI type 440C martensitic stainless steel is utilized in the MK49 turbopumps and the present invention will be particularly described with respect to this application.

Shot peening is a well known cold working metallurgical process used primarily to increase the fatigue life of metal parts. It is also used to prevent stress-corrosion cracking, form parts, or to correct their shape or to work-harden surfaces. The surface of the finished part is bombarded at a given intensity (measured in Almen units) with round steel, ceramic, or glass shot of a particular size, either in hand-held nozzles or in special machines, under controlled conditions including velocity and time. Every piece of the shot effectively acts as a tiny peening hammer. When a surface has been peened all over by the multitude of impacts, the resultant residually stressed surface layer is in compression, thereby resisting surface tensile stresses which cause cracking.

The current applications for shot peening are quite varied. Metal Improvement Co., Inc. publishes a manual entitled "Shot Peening Applications" which lists the various applications which include springs, torsion bars, shafts and axles, gears, connecting rods, crankshafts, blades and valves. The technology has never been applied to bearing inner rings because until the development of high speed cryogenic turbomachinery applications, the interference fits on bearings were not such that stress corrosion was a potential problem. In addition, AISI type 440C is an extremely hard and brittle material, which would not normally be very responsive to shot peening. For a given intensity of shot peening, the depth to which compressive stresses would be developed would be much less than in a softer material. In addition, overpeening could be expected to damage (microcrack) the surface, negating any beneficial effects.

However, we have now discovered that by a sequence of three steps, the first of which involves shot peening, that the life expectancy of bearing inner rings for high speed rotating machinery, which must be installed with relatively tight fits, is greatly increased.

Figure 1:
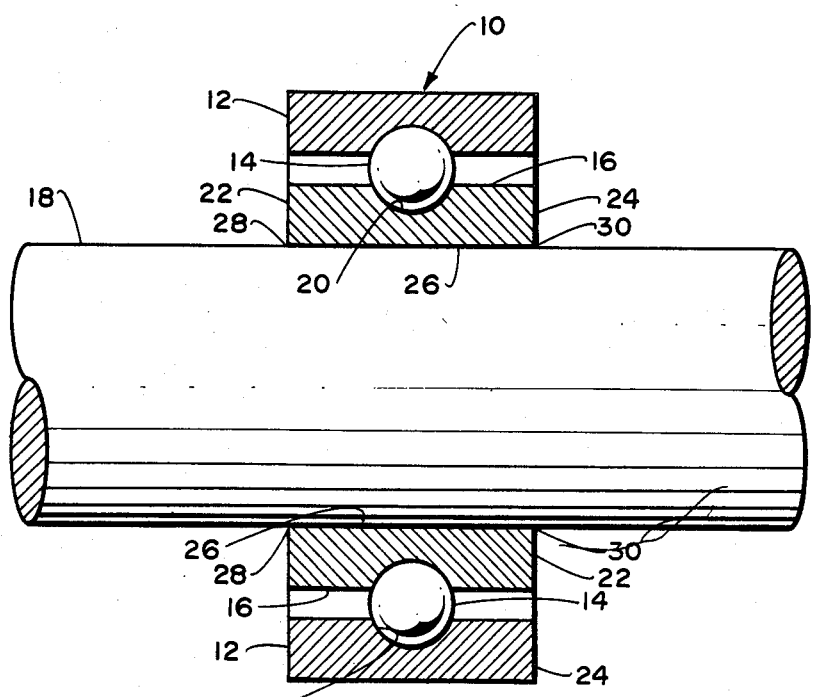
FIG. 1 is a schematic cross-sectional representation of a typical bearing in relation to a shaft.

In FIG. 1 a typical bearing 10 is illustrated having an outer ring 12, a plurality of balls 14 and an inner ring 16. The inner ring 16 is shown emplaced on a shaft 18. The inner ring 16 comprises a raceway 20, two endwalls 22,24 and a substantially cylindrical inner surface 26. In the first step of this process at least the surfaces on the inner ring 16 most susceptible to stress corrosion cracking are shot peened. The surfaces most susceptible are at the areas at and near the junctures 28,30 of the endwalls 22,24 with the inner surface 26. For practical purposes the entirety of the endwalls 22,24 and inner surface 26 are shot peened; however, it is understood that, within the scope of the invention, not all of each surface is required to be shot peened. It is required that the areas at and near junctures 28,30 be shot peened. The shot peened surface is shot peened with sufficient intensity to produce residual compressive stress which offsets at least a portion of the tensile stress resulting from the installation interference fit. The installation interference fit for small bearings, running at high speeds, in a cryogenic environment may impose hoop tensile stresses in excess of 30 ksi (which is believed to be the threshold stress level for stress corrosion cracking in AISI type 440C stainless steel).

Figure 2:
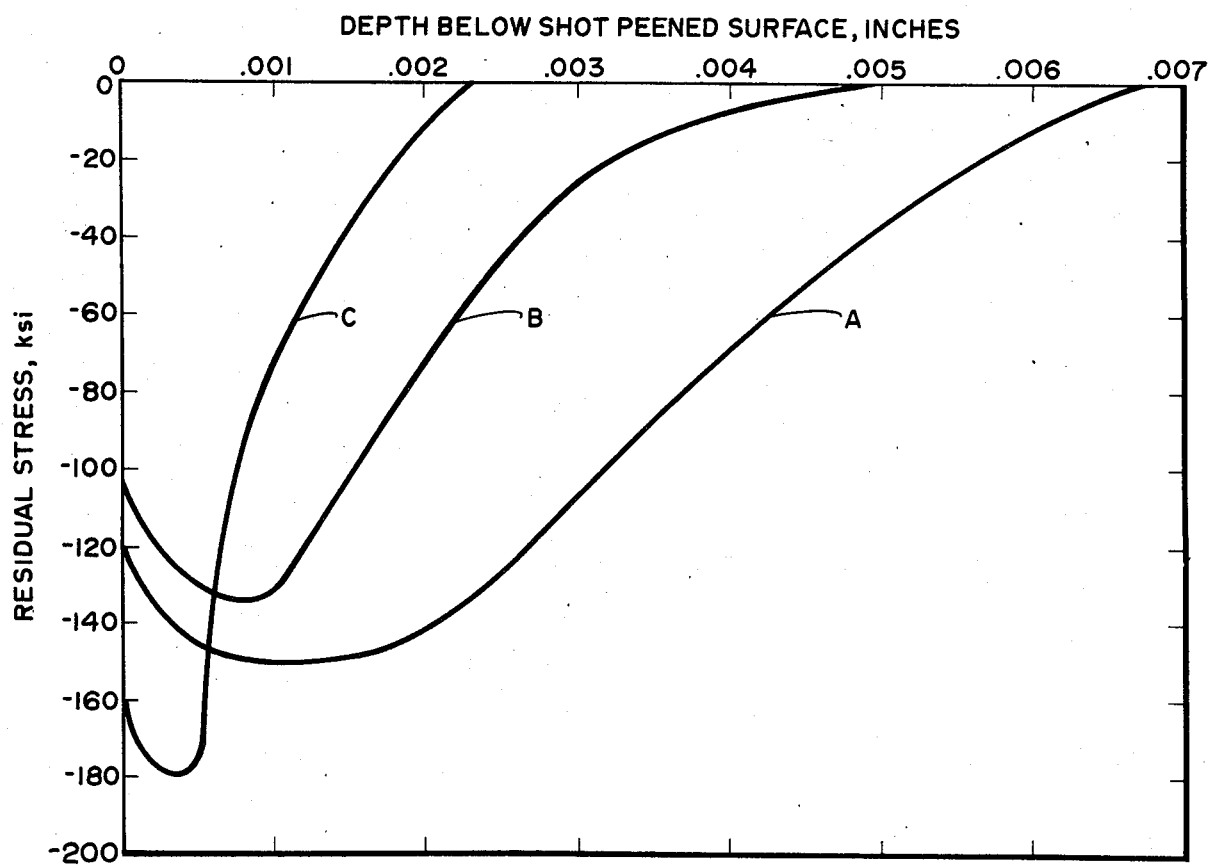
FIG. 2 is an illustration of the distribution of residual stress in AISI type 440C stainless steel bearing inner rings for three levels of shot peening intensity.

Construction of a graph of "Residual Stress" vs. "Depth Below the Shot Peened Surface" is useful in determining the desired shot peening intensity. Results from experiments with 440C stainless steel bearing inner rings are illustrated in FIG. 2. The experimental parameters were as follows:

| Curve | Intensity | Shot/Size |
|---|---|---|
| A | .014A | steel-330 |
| B | .009A | steel-230 |
| C | .009N | AD glass |

As noted, from this figure, a residual stress of −30 ksi will be achieved in a surface shot peened with an intensity of 0.014 A at a depth of approximately 0.005 inches below the shot peened surface (Curve A). The same residual stress (−30 ksi) will be achieved in a surface shot peened with an intensity of 0.009 A at a depth of approximately 0.003 inches below the shot peened surface (Curve B). At yet a lower intensity, 0.009N, this residual stress will be achieved at approximately 0.015 inches below the shot peened surface (Curve C). It is desirable to achieve the required residual stress at a depth as great as possible in order to provide protection even if the surface is damaged, for example, by scratching during installation. However, the intensity must not be too high or cracking can occur as a result of the shot peening operation which may negate the beneficial effects of the shot peening. If steel shot is used as the shot peening medium any residual shot peen material should be removed by a passivation process using an acid formulation which will dissolve the steel shot residue without harming the bearing material.

In the second step of the process the shot peened surface is coated with metallic material. Preferably, electrodeposited nickel with a thickness of approximately 0.0002 inches may be utilized. Coating the shot peened surface provides a physical barrier between the AISI type 440C stainless steel and the moist "corrosive" environment. Without the presence of the "corrosive" medium stress corrosion cracking will be detered. The coating should be as thin as possible while still providing an integral barrier and should be applied evenly to facilitate the final sizing of the inner surface. Instead of electroplating the shot peened surface other coatings may be utilized such as electroless plating, sputtered metal coatings, plasma sprayed coatings or vapordeposited coatings.

Finally the inner ring is baked to remove hydrogen resulting from the coating step. Preferably the inner bearing ring is baked at between 250° F. and 300° F. for several hours (approximately six to ten hours) within one hour after the coating is applied.

EXAMPLE

A correlative investigation of several 12 mm bearing inner rings formed of 440C stainless steel has revealed the benefits of the subject novel process. In the ongoing investigation all rings have been exposed to the same humid environment. Three rings had no surface treatment, two rings were shot peened with no subsequent surface treatment, two rings were coated with electrodeposited nickel and then baked (i.e., no shot peening) and three rings were shot peened and subsequently coated with electrodeposited nickel and then baked. Shot peening of all the test objects was at an intensity between 0.012 A and 0.015 A. All rings which were coated with electrodeposited nickel were initially plated to a thickness of approximately 0.0010 inches and then machined to a thickness of approximately 0.0005 inches. Within one hour after plating was complete the rings were baked at 300° F. for eight hours. The results of this investigation are follows:

All three of the rings which had no surface treatment cracked within three days. Of the two shot peened rings which had no subsequent surface treatment, one cracked within 18 days, and as of the filing of this patent application, after approximately 1,000 days, the second has still not cracked. Of the two rings which were coated with electrodeposited nickel only (no shot peening) one cracked in approximately three days and the other cracked in 44 days. Of the three rings which were shot peened, coated and baked all three have remained intact (approximately 1,000 days).

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of inhibiting stress corrosion cracking of a bearing of the type installed on a shaft with an interference fit said bearing including an inner ring having a substantially cylindrical inner surface terminating at opposite ends and having radially extending endwalls, comprising the sequential steps of:
   (a) shot peening the surface of the inner ring at least at and near the junctures of the endwalls with said cylindrical inner surface, said shot peening being performed with sufficient intensity to produce residual compressive stress which offsets at least a portion of the tensile stress resulting from installation interference fit;
   (b) coating the shot peened surface with a thin metallic material; and
   (c) baking the inner ring to remove hydrogen resulting from said coating.

2. The method of claim 1 wherein the shot peening is performed at an Almen intensity within the range of 0.009N to 0.014 A.

3. The method of claim 2 wherein the residual compressive stress produced extends to a depth of 0.002 to 0.007 inches below the shot peened surface.

4. The method of claim 1 wherein said coating step has the effect of producing a metallic material with a minimum thickness of 0.0002 inches.

5. The method of claim 4 wherein the metallic material is electrodeposited nickel.

6. The method of claim 1 wherein the inner ring is formed of a hardened martensitic stainless steel.

7. The method of claim 6 wherein the inner ring is formed of AISI type 440C stainless steel.

8. The method of claim 1 wherein the shot peening medium is steel shot with a hardness in excess of $R_c 60$ and wherein any residual steel shot remaining is removed by passivation.

9. The method of claim 1 wherein the shot peening medium is glass beads.

10. The method of claim 1 wherein the shot peening medium is ceramic beads.

11. The method of claim 1 wherein the inner ring is baked at between 250° F. and 300° F. for between six and ten hours.

12. The method of claim 1 wherein the shot peened surface includes the entirety of said endwalls.

13. The method of claim 1 wherein the shot peened surface includes the entirety of said inner surface.

14. The method of claim 1 wherein the shot peened surface includes the entirety of said endwalls and said inner surface.

* * * * *